US012789915B2

(12) United States Patent
Park et al.

(10) Patent No.: US 12,789,915 B2
(45) Date of Patent: Nov. 10, 2026

(54) VEHICLE BODY STRUCTURE

(71) Applicants: Hyundai Motor Company, Seoul (KR); Kia Corporation, Seoul (KR)

(72) Inventors: Ji Woong Park, Hwaseong-si (KR); Il Do Kim, Hwaseong-si (KR); Sun Ju Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 266 days.

(21) Appl. No.: 18/811,272

(22) Filed: Aug. 21, 2024

(65) Prior Publication Data

US 2025/0187675 A1 Jun. 12, 2025

(30) Foreign Application Priority Data

Dec. 6, 2023 (KR) ........................ 10-2023-0176006

(51) Int. Cl.
*B62D 25/20* (2006.01)
*B62D 25/14* (2006.01)

(52) U.S. Cl.
CPC ....... *B62D 25/2045* (2013.01); *B62D 25/142* (2013.01)

(58) Field of Classification Search
CPC .. B62D 25/2045; B62D 25/142; B62D 25/08; B62D 25/14; B62D 25/145; B62D 25/2018; B62D 25/02; B62D 25/2009; B62D 25/082; B62D 21/03; B62D 21/152; B60H 1/00392; B60Y 2200/91
USPC ............ 296/187.08, 187.09, 193.07, 193.09, 296/203.02, 204, 70
See application file for complete search history.

(56) References Cited

U.S. PATENT DOCUMENTS

| | | | | |
|---|---|---|---|---|
| 9,096,274 | B2 | 8/2015 | Kaneko | |
| 10,160,493 | B2 | 12/2018 | Atsumi et al. | |
| 10,597,081 | B2 * | 3/2020 | Ayukawa | B62D 25/2018 |
| 2009/0195019 | A1 | 8/2009 | Yamada et al. | |
| 2011/0156446 | A1 | 6/2011 | Iwase et al. | |
| 2013/0069393 | A1 * | 3/2013 | Kihara | B62D 25/082 296/203.02 |
| 2014/0152044 | A1 | 6/2014 | Kaneko | |

(Continued)

FOREIGN PATENT DOCUMENTS

| | | | |
|---|---|---|---|
| EP | 1810892 | A1 | 7/2007 |
| JP | 4501623 | B2 | 7/2010 |

(Continued)

*Primary Examiner* — Amy R Weisberg
*Assistant Examiner* — Denise Lynne Esquivel
(74) *Attorney, Agent, or Firm* — Slater Matsil, LLP

(57) ABSTRACT

An embodiment vehicle body structure includes a floor panel, a dash crossmember mounted at a front edge of the floor panel, and a dash panel connected to a top edge of the dash crossmember, wherein the dash crossmember includes a cross portion extending in a width direction of a vehicle and a front portion protruding from the cross portion toward a front of the vehicle, wherein the front portion includes a horizontal wall protruding horizontally from the cross portion toward the front of the vehicle, an upper flange extending vertically upward from the horizontal wall, and a lower flange extending vertically downward from the horizontal wall, and wherein the horizontal wall, the upper flange, and the lower flange each extend in the width direction of the vehicle.

20 Claims, 5 Drawing Sheets

(56) References Cited

U.S. PATENT DOCUMENTS

| | | | | |
|---|---|---|---|---|
| 2019/0300055 | A1* | 10/2019 | Yamauchi | B62D 25/088 |
| 2020/0148146 | A1* | 5/2020 | Chung | B60R 19/34 |
| 2022/0177041 | A1* | 6/2022 | Hong | B62D 25/025 |
| 2023/0182820 | A1* | 6/2023 | Park | B60K 1/00<br>180/68.5 |
| 2023/0382183 | A1* | 11/2023 | Cho | B62D 25/08 |

FOREIGN PATENT DOCUMENTS

| | | | |
|---|---|---|---|
| KR | 20110000431 | A | 1/2011 |
| KR | 20140039324 | A | 4/2014 |

* cited by examiner

VEHICLE BODY STRUCTURE

CROSS-REFERENCE TO RELATED APPLICATIONS

This application claims the benefit of Korean Patent Application No. 10-2023-0176006, filed on Dec. 6, 2023, which application is hereby incorporated herein in its entirety by reference.

TECHNICAL FIELD

The present disclosure relates to a vehicle body structure.

BACKGROUND

A vehicle may include a dash panel by which a passenger compartment and a front compartment are partitioned. A front surface of the dash panel may face the front compartment, and a rear surface of the dash panel may face the passenger compartment. A powertrain system including a prime mover may be disposed in the front compartment. For example, an internal combustion engine vehicle may have a mechanical powertrain system including an internal combustion engine and a transmission in the front compartment, and an electric vehicle may have an electric powertrain system including an electric motor, an inverter, and a transmission in the front compartment.

Since the electric vehicle has no internal combustion engine in the front compartment, the front compartment of the electric vehicle may have larger room than the front compartment of the internal combustion engine vehicle. By placing a battery below a floor of the electric vehicle, the electric vehicle may have a flat floor structure.

In the internal combustion engine vehicle according to the related art, a heating, ventilation, and air conditioning (HVAC) module may be disposed in the passenger compartment, so the space of the passenger compartment may be relatively narrow. For example, the HVAC module in the related art internal combustion engine vehicle may be mounted on the rear surface of the dash panel so that the HVAC module may be disposed in the passenger compartment.

On the other hand, the electric vehicle has no internal combustion engine in the front compartment so that the front compartment of the electric vehicle may have enough room for at least some HVAC components of the HVAC module. Accordingly, when at least some HVAC components of the HVAC module are disposed in the front compartment of the electric vehicle, the passenger compartment of the electric vehicle may secure a relatively large space.

The above information described in this background section is provided to assist in understanding the background of the inventive concept and may include any technical concept which is not considered as the already known prior art.

SUMMARY

The present disclosure relates to a vehicle body structure. Particular embodiments relate to a vehicle body structure improving crashworthiness and facilitating the mounting of a heating, ventilation, and air conditioning (HVAC) module.

Embodiments of the present disclosure can solve problems occurring in the prior art while advantages achieved by the prior art are maintained intact.

An embodiment of the present disclosure provides a vehicle body structure improving crashworthiness and facilitating the mounting of a heating, ventilation, and air conditioning (HVAC) module.

According to an embodiment of the present disclosure, a vehicle body structure may include a floor panel, a dash crossmember mounted at a front edge of the floor panel, and a dash panel connected to a top edge of the dash crossmember. The dash crossmember may include a cross portion extending in a width direction of a vehicle and a front portion protruding from the cross portion toward the front of the vehicle. The front portion may include a horizontal wall protruding horizontally from the cross portion toward the front of the vehicle, an upper flange extending vertically upward from the horizontal wall, and a lower flange extending vertically downward from the horizontal wall. The horizontal wall, the upper flange, and the lower flange may extend in the width direction of the vehicle.

The upper flange may be vertically aligned with the lower flange.

The vehicle body structure may further include an HVAC module mounted in the dash panel and a protective wall disposed on a front portion of the HVAC module.

The HVAC module may be connected to the upper flange of the front portion through a bracket, and a bottom flange of the protective wall may be mounted on the lower flange of the front portion.

The front portion may further include a stud bolt protruding from the lower flange toward the front of the vehicle. The bottom flange of the protective wall may be mounted on the stud bolt.

The front portion may further include a protruding wall protruding from the horizontal wall toward the front of the vehicle. The protective wall may further include a horizontal wall connected to the bottom flange and a recessed wall recessed downward from the horizontal wall. The protruding wall of the front portion may contact the recessed wall of the protective wall.

The protruding wall may be horizontally aligned with the horizontal wall of the front portion.

The front portion may further include a plurality of reinforcing ribs provided on the horizontal wall.

The cross portion may include a reinforcement and a vertical wall extending vertically from the reinforcement. A bottom edge of the dash panel may be fixed to a top edge of the vertical wall.

The horizontal wall of the front portion may protrude horizontally from the vertical wall of the cross portion toward the front of the vehicle.

The dash crossmember may further include a pair of outrigger portions provided at both ends of the cross portion and a pair of reinforcing portions provided at both ends of the front portion. A width of each reinforcing portion may gradually increase from each end portion of the front portion toward a corresponding outrigger portion.

Each reinforcing portion may include a horizontal wall and a side extension wall provided at a front edge of the horizontal wall. The side extension wall may extend diagonally from each end portion of the front portion toward the corresponding outrigger portion.

Each reinforcing portion may further include a reinforcing rib provided on the horizontal wall thereof.

The vehicle body structure may further include a pair of reinforcing members mounted on the floor panel, and each reinforcing member may extend in a longitudinal direction of the vehicle.

Each reinforcing portion may be aligned with a corresponding reinforcing member along the longitudinal direction of the vehicle.

The reinforcing member may have higher strength than the dash crossmember.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
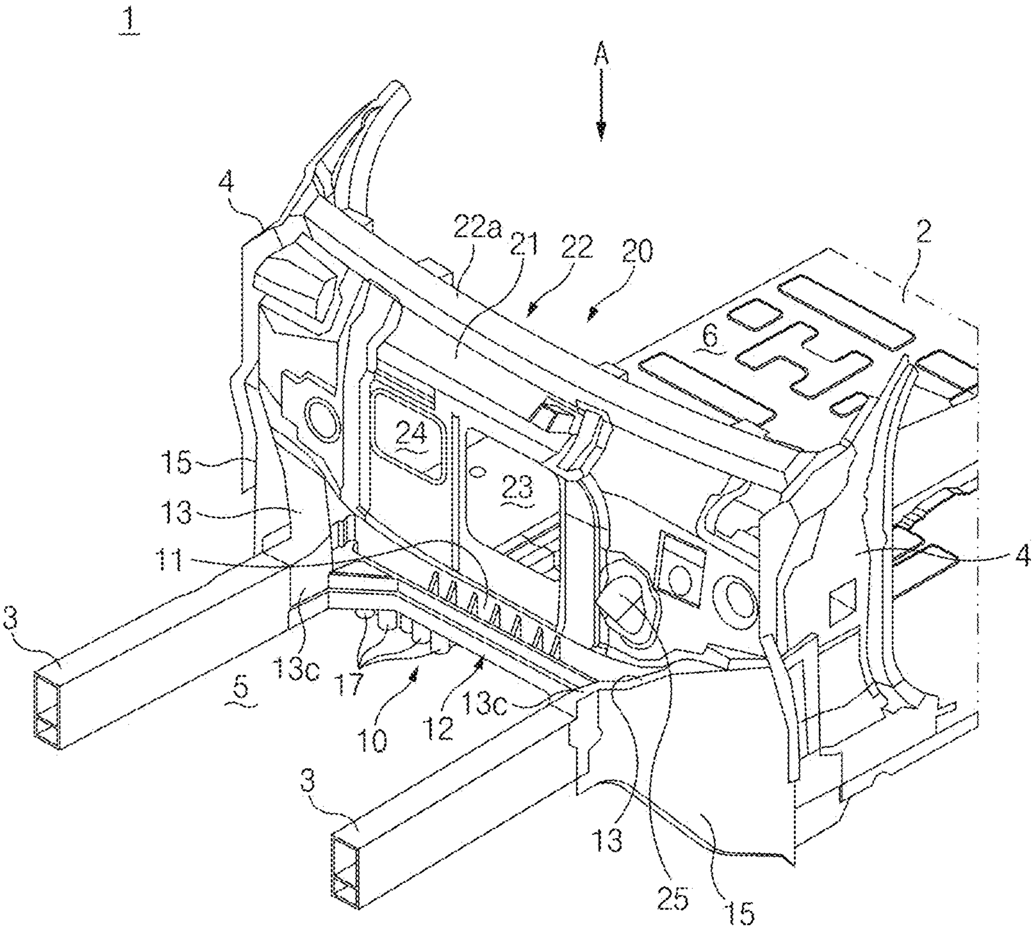
FIG. 1 illustrates a perspective view of a vehicle body structure according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art and are not to be interpreted as having ideal or excessively formal meanings unless clearly defined as having such in the present application.

Referring to FIG. 1, a vehicle body structure 1 according to an exemplary embodiment of the present disclosure may include a floor panel 2, a dash crossmember 10 mounted at a front edge of the floor panel 2, and a dash panel 20 connected to a top edge of the dash crossmember 10.

The floor panel 2 may form a bottom of a passenger compartment 6, and a battery may be disposed below the floor panel 2.

The dash crossmember 10 may be fixed to the front edge of the floor panel 2 using fasteners, welding, and/or the like. The dash crossmember 10 may extend in a width direction of the vehicle.

The dash panel 20 may be fixed to the top edge of the dash crossmember 10 by mechanical, thermal, and/or chemical coupling/joining. Referring to FIG. 1, the dash panel 20 may include a panel portion 21 and a windshield matching portion 22 integrally formed with a top edge of the panel portion 21. The panel portion 21 may have a plurality of mounting openings 23 and 24 in which some HVAC components of an HVAC module 50 are mounted. The windshield matching portion 22 may have a matching surface 22*a* which matches a bottom end of a windshield, and the matching surface 22*a* may be inclined at an angle corresponding to an angle of inclination of the windshield. The windshield matching portion 22 may be located below a windshield wiper. For example, the dash panel 20 may include at least one of metal and resin. The dash panel 20 may be manufactured by pressing, casting, and/or the like.

The dash crossmember 10 may be mounted at the front edge of the floor panel 2, and the dash panel 20 may be connected to the top edge of the dash crossmember 10 so that the dash crossmember 10 and the dash panel 20 may partition a front compartment 5 from the passenger compartment 6. A powertrain system including a prime mover may be disposed in the front compartment 5. For example, an internal combustion engine vehicle may have a mechanical powertrain system including an internal combustion engine and a transmission in the front compartment 5, and an electric vehicle may have an electric powertrain system including an electric motor, an inverter, and a transmission in the front compartment 5.

A pair of front side members 3 may extend from the dash crossmember 10 toward the front of the vehicle. A pair of front pillars 4 may be mounted at both ends of the dash crossmember 10 and both ends of the dash panel 20, respectively. Each front pillar 4 may be fixed to the corresponding end of the dash crossmember 10 and the corresponding end of the dash panel 20 using fasteners, welding, and/or the like.

Figure 2:
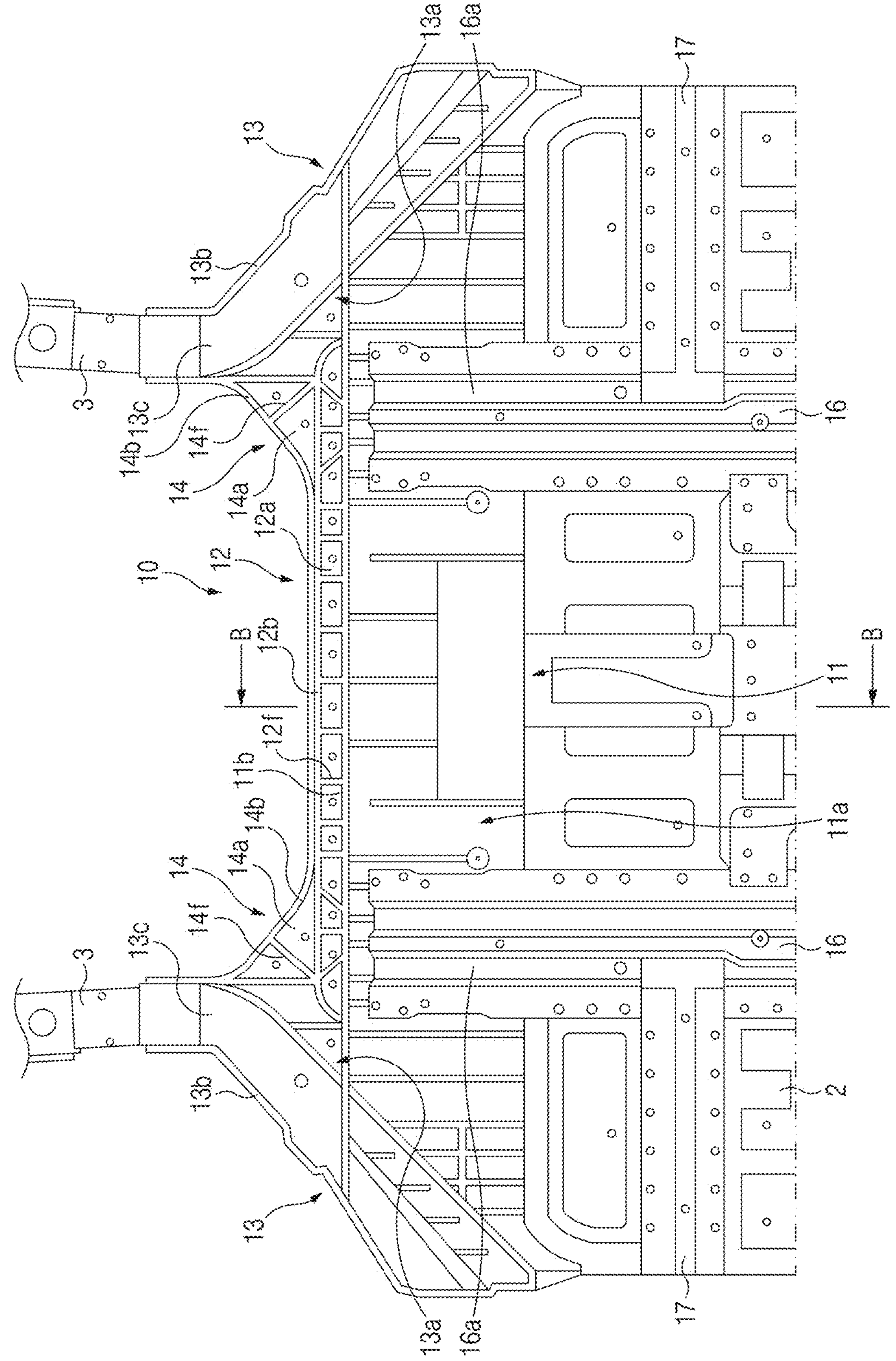
FIG. 2 illustrates a plan view of the vehicle body structure, which is viewed in a direction of arrow A in FIG. 1, and from which a dash panel is removed.

Referring to FIG. 2, the dash crossmember 10 may include a cross portion 11 extending in the width direction of the vehicle, a front portion 12 protruding from the cross portion 11 toward the front of the vehicle, and a pair of outrigger portions 13 provided at both ends of the cross portion 11. The dash crossmember 10 may be manufactured by a casting method such as a high-vacuum die casting method so that the cross portion 11, the front portion 12, and the outrigger portions 13 may form a unitary one-piece structure.

Figure 3:
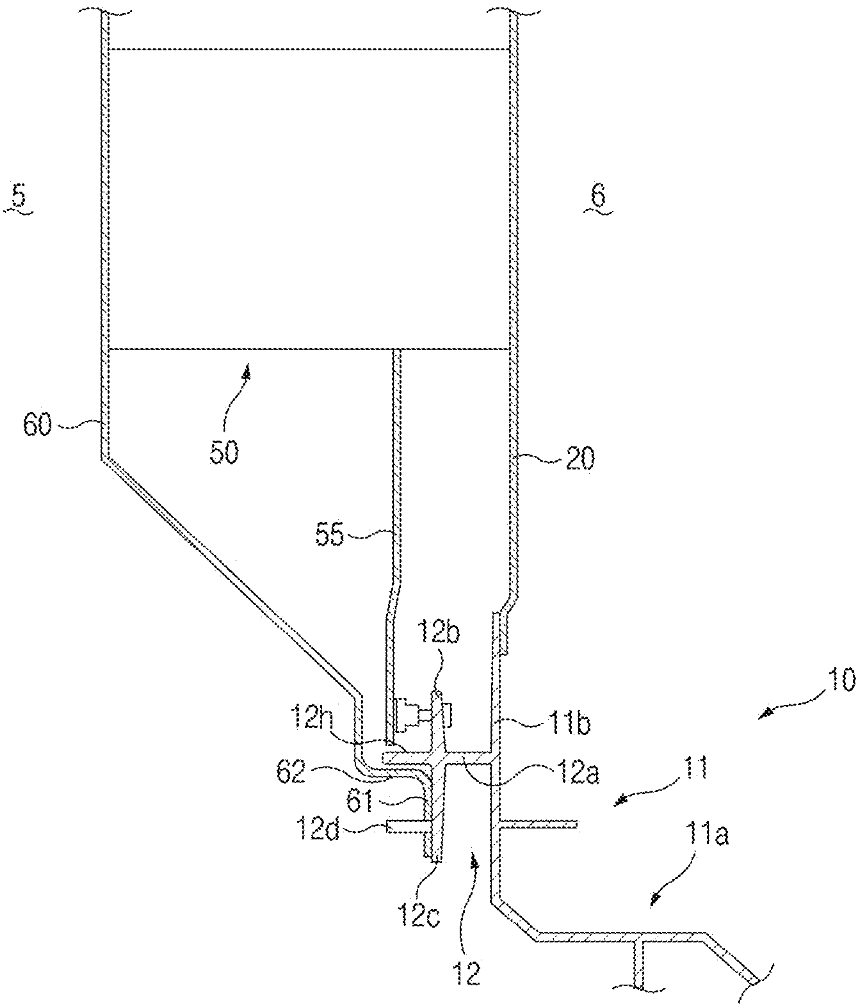
FIG. 3 illustrates a cross-sectional view, taken along line B-B of FIG. 2.

Referring to FIGS. 2 and 3, the cross portion 11 may include a reinforcement 11*a* and a vertical wall 11*b* extending vertically from the reinforcement 11*a*. The reinforcement 11*a* and the vertical wall 11*b* may extend in the width direction of the vehicle.

The reinforcement 11*a* may include a plurality of ribs intersecting with each other, and the plurality of ribs may extend in a longitudinal direction of the vehicle, the width direction of the vehicle, and a diagonal direction. Accordingly, stiffness of the reinforcement 11*a* may be improved by the plurality of ribs.

Referring to FIG. 3, the vertical wall 11*b* may extend vertically from the reinforcement 11*a* toward the dash panel 20, and a bottom edge of the dash panel 20 may be fixed to a top edge of the vertical wall 11*b* using fasteners, welding, and/or the like.

Referring to FIG. 2, the front portion 12 may extend in the width direction of the vehicle and a longitudinal direction of the cross portion 11. Referring to FIG. 3, the front portion 12 may protrude from the cross portion 11 toward the front of the vehicle by a predetermined length so that the front portion 12 may absorb impact energy in the event of a frontal collision/impact of the vehicle. Referring to FIG. 3, the front portion 12 may include a horizontal wall 12*a* protruding horizontally from the vertical wall 11*b* of the cross portion 11 toward the front of the vehicle, an upper flange 12*b* extending vertically upward from the horizontal wall 12*a*, and a lower flange 12*c* extending vertically downward from the horizontal wall 12*a*. The upper flange 12*b* may be vertically aligned with the lower flange 12*c*, and the upper flange 12*b* and the lower flange 12*c* may be spaced apart from the vertical wall 11*b* of the cross portion 11 toward the front of the vehicle.

Referring to FIG. 2, the front portion 12 may further include a plurality of reinforcing ribs 12*f* provided on the horizontal wall 12*a* of the front portion 12. Stiffness of the front portion 12 may be improved by the plurality of reinforcing ribs 12*f*. Each reinforcing rib 12*f* may be configured to connect the upper flange 12*b* of the front portion 12 and the vertical wall 11*b* of the cross portion 11. The reinforcing rib 12*f* and the upper flange 12*b* may be connected to intersect with each other. According to an exemplary embodiment, each reinforcing rib 12*f* may extend in a longitudinal axis of the vehicle, and accordingly the reinforcing rib 12*f* may be perpendicular to the upper flange 12*b*. The plurality of reinforcing ribs 12*f* may be spaced apart from each other in the width direction of the vehicle, and the front portion 12 may have a plurality of cavities defined by the plurality of reinforcing ribs 12*f*, the upper flange 12*b* of the front portion 12, and the vertical wall 11*b* of the cross portion 11.

Referring to FIG. 3, the horizontal wall 12*a*, the upper flange 12*b*, and the lower flange 12*c* of the front portion 12 may extend along the width direction of the vehicle and the longitudinal direction of the cross portion 11, and the horizontal wall 12*a* of the front portion 12 may be perpendicular to the vertical wall 11*b* of the cross portion 11. The upper flange 12*b* and the lower flange 12*c* of the front portion 12 may be parallel to the vertical wall 11*b* of the cross portion 11. The horizontal wall 12*a*, the upper flange 12*b*, and the lower flange 12*c* of the front portion 12 may form an asymmetrical H-shaped cross section together with the vertical wall 11*b* of the cross portion 11. Accordingly, the upper flange 12*b* and the lower flange 12*c* of the front portion 12, the horizontal wall 12*a* of the front portion 12, and the vertical wall 11*b* of the cross portion 11 may define the cavities.

Some HVAC components (for example, an air conditioning section and a blower section) of the HVAC module 50 may be disposed in front of the dash panel 20 so that some HVAC components of the HVAC module 50 may be located in the front compartment 5, and the other components (for example, an air distributer section) of the HVAC module 50 may be disposed behind the dash panel 20 so that the other HVAC components of the HVAC module 50 may be located in the passenger compartment 6. Some HVAC components of the HVAC module 50 located in the front compartment 5 may be protected by a protective wall 60. The protective wall 60 may be disposed on a front portion of the HVAC module 50, and accordingly the protective wall 60 may protect the HVAC module 50 from thermal injury and/or the like.

A pair of suspension towers (not shown) may be mounted on the pair of front side members 3, respectively. An upper portion of a suspension damper such as a shock absorber may be mounted on each suspension tower. Each suspension tower may be connected transverse to a corresponding fender apron member and its adjacent front side member 3. A top edge of the suspension tower may be fixed to the fender apron member, and a bottom edge of the suspension tower may be fixed to the front side member 3. Both left and right edges of the protective wall 60 may be mounted on the pair of suspension towers using fasteners, welding, and/or the like, and a bottom edge of the protective wall 60 may be mounted on the dash crossmember 10 using fasteners, welding, and/or the like.

Referring to FIG. 3, the HVAC module 50 may be connected to the upper flange 12*b* of the front portion 12 through a plurality of brackets 55 so that the HVAC module 50 may be stably supported by the upper flange 12*b* of the front portion 12. A bottom end portion of each bracket 55 may be mounted on the upper flange 12*b* of the front portion 12 using fasteners and/or the like.

The protective wall 60 may have a bottom flange 61 provided at the bottom edge thereof, and the bottom flange 61 of the protective wall 60 may be mounted on the lower flange 12*c* of the front portion 12 using fasteners, welding, and/or the like. In addition, the protective wall 60 may have a horizontal wall 62 extending horizontally from a top end of the bottom flange 61 toward the front of the vehicle. Referring to FIG. 3, the front portion 12 may have a stud bolt 12*d* protruding from the lower flange 12*c* toward the front of the vehicle. The bottom flange 61 of the protective wall 60 may have a through hole into which the stud bolt 12*d* of the lower flange 12*c* is inserted, and the stud bolt 12*d* and a nut may be screwed so that the bottom flange 61 of the protective wall 60 may be mounted on the stud bolt 12*d* of the front portion 12.

As described above, the HVAC module 50 mounted in the mounting openings 23 and 24 of the dash panel 20 may be connected to the front portion 12 of the dash crossmember 10 through the brackets 55, and the protective wall 60 for protecting the HVAC module 50 may be connected to the front portion 12 of the dash crossmember 10. Accordingly, the HVAC module 50 and the protective wall 60 may be stably supported by the front portion 12 of the dash crossmember 10, and the mounting of the HVAC module 50 and the protective wall 60 may be facilitated.

Figure 4:
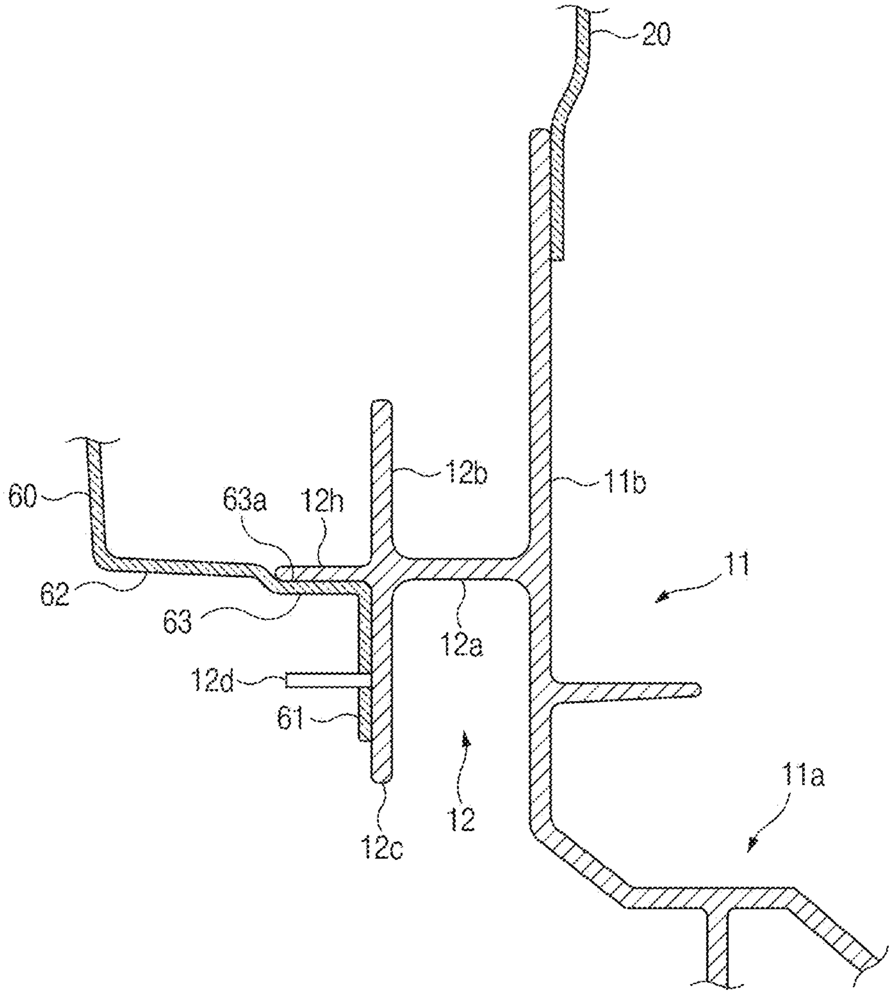
FIG. 4 illustrates a cross-sectional view of a connection between a front portion and a protective wall in a vehicle body structure according to another exemplary embodiment of the present disclosure.

Referring to FIGS. 3 and 4, the front portion 12 may further include a protruding wall 12*h* protruding toward the front of the vehicle. The protruding wall 12*h* may protrude from the upper flange 12*b* and/or the lower flange 12*c*. According to an exemplary embodiment of the present disclosure, the protruding wall 12*h* may be horizontally aligned with the horizontal wall 12*a* of the front portion 12. Referring to FIG. 4, the protective wall 60 may further include a recessed wall 63 which is recessed from the horizontal wall 62 by a predetermined depth, and the protruding wall 12*h* of the front portion 12 may contact a top surface 63*a* of the recessed wall 63. As the protruding wall 12*h* of the front portion 12 contacts the top surface 63*a* of the recessed wall 63 of the protective wall 60, sealability between the front portion 12 and the protective wall 60 may be ensured. The protruding wall 12*h* of the front portion 12 may be fixed to the top surface 63*a* of the recessed wall 63 using fasteners, welding, and/or the like. According to an exemplary embodiment, the depth of the recessed wall 63 may correspond to a thickness of the protruding wall 12*h* of the front portion 12.

Referring to FIG. 2, the pair of outrigger portions 13 may be provided at both ends of the cross portion 11, and rear end portions of the pair of front side members 3 may be connected to the pair of outrigger portions 13, respectively.

A gap between front ends of the pair of outrigger portions 13 may be less than a gap between rear ends of the pair of outrigger portions 13.

Referring to FIG. 2, each outrigger portion 13 may include an inboard-side portion 13*a* facing the interior of the vehicle, an outboard-side portion 13*b* facing the exterior of the vehicle, and a front connection portion 13*c* provided on a front portion thereof. The inboard-side portion 13*a* may be closed to the interior of the vehicle, and the inboard-side portion 13*a* may be connected to the cross portion 11 and the front portion 12. The outboard-side portion 13*b* may be open to the exterior of the vehicle. The outrigger portion 13 may have a plurality of ribs formed therein, and stiffness of the outrigger portion 13 may be improved by the plurality of ribs. Each front side member 3 may be connected to the corresponding front connection portion 13*c*, and the front connection portion 13*c* may have a receiving space for the rear end portion of the front side member 3. The rear end portion of the front side member 3 may be received in the receiving space of the front connection portion 13*c*, and the rear end portion of the front side member 3 may be fixed to the front connection portion 13*c* using fasteners, welding, and/or the like.

Referring to FIG. 1, the dash crossmember 10 may further include a pair of outer plates 15 fixed to the pair of outrigger portions 13, respectively. Each outer plate 15 may be fixed to the outboard-side portion 13*b* of the corresponding outrigger portion 13, thereby closing the outboard-side portion 13*b* of the outrigger portion 13 and improving the stiffness of the outrigger portion 13.

Referring to FIG. 2, the dash crossmember 10 may further include a pair of reinforcing portions 14 provided at both ends of the front portion 12. Each reinforcing portion 14 may form a triangular truss structure at each end portion of the dash crossmember 10, and thus stiffness and strength of the dash crossmember 10 may be increased by the pair of reinforcing portions 14. A width of each reinforcing portion 14 may gradually increase from each end portion of the front portion 12 toward the inboard-side portion 13*a* of the corresponding outrigger portion 13. Each front side member 3 may be connected to the front connection portion 13*c* of the corresponding outrigger portion 13 so that each reinforcing portion 14 may be closer to a central longitudinal axis of the vehicle than the corresponding front side member 3 and the corresponding outrigger portion 13. The cross portion 11, the front portion 12, the pair of outrigger portions 13, and the pair of reinforcing portions 14 may form a unitary one-piece structure. As the cross portion 11, the front portion 12, the pair of outrigger portions 13, and the pair of reinforcing portions 14 form a unitary one-piece structure, the number of components of the dash crossmember 10 may be reduced, and joint portions of the dash crossmember 10 may be minimized, and thus the manufacturing cost may be significantly reduced. In addition, since there are no joint portions of the dash crossmember 10 made by fasteners, welding, and/or the like, not only stiffness of a load path but also strength and connection stiffness of the dash crossmember 10 may be improved. In the event of a vehicle collision/impact, deformation of the dash crossmember 10 may be minimized so that damage to the battery may be prevented.

Referring to FIG. 2, each reinforcing portion 14 may include a horizontal wall 14*a* extending from the upper flange 12*b* of the front portion 12 toward the inboard-side portion 13*a* of the corresponding outrigger portion 13 and a side extension wall 14*b* provided at a front edge of the horizontal wall 14*a*. The horizontal wall 14*a* may be configured to connect the side extension wall 14*b* and the upper flange 12*b* of the front portion 12. The side extension wall 14*b* may extend diagonally from each end portion of the upper flange 12*b* of the front portion 12 toward the front connection portion 13*c* of the corresponding outrigger portion 13 so that the reinforcing portion 14 may form a triangular truss structure. Each side extension wall 14*b* may be inclined at a predetermined angle with respect to the longitudinal axis of the vehicle. As each reinforcing portion 14 integrally connects the front portion 12 and the corresponding outrigger portion 13, deformation between the front portion 12 and the outrigger portion 13 may be minimized in the event of a vehicle collision/impact.

Each reinforcing portion 14 may further include a reinforcing rib 14*f* provided on the horizontal wall 14*a*, and the reinforcing rib 14*f* may be connected to the side extension wall 14*b*. The reinforcing rib 14*f* may be inclined at a predetermined angle with respect to the horizontal wall 14*a*. The reinforcing rib 14*f* may extend diagonally from the side extension wall 14*b* toward the corresponding outrigger portion 13.

Referring to FIG. 2, the vehicle body structure according to an exemplary embodiment of the present disclosure may further include a pair of reinforcing members 16 mounted on the floor panel 2. Each reinforcing member 16 may extend in the longitudinal direction of the vehicle, and a front end portion 16*a* of the reinforcing member 16 may be directly fixed to the cross portion 11 of the dash crossmember 10. Each reinforcing portion 14 may be aligned with the corresponding reinforcing member 16 along the longitudinal direction of the vehicle. In particular, a rear end of the reinforcing portion 14 may be configured to face the front end portion 16*a* of the corresponding reinforcing member 16. The reinforcing portions 14 may be aligned with the reinforcing members 16 along the longitudinal direction of the vehicle, respectively, so that stiffness, strength, and crashworthiness of the vehicle body structure may be improved.

According to an exemplary embodiment, the reinforcing member 16 may have higher strength than the dash crossmember 10, thereby significantly improving the crashworthiness of the vehicle body structure.

Referring to FIG. 2, the vehicle body structure according to an exemplary embodiment of the present disclosure may further include a pair of connection members 17 connected to the pair of reinforcing members 16, respectively. Each connection member 17 may extend in the width direction of the vehicle, and accordingly the connection member 17 may be perpendicular to the corresponding reinforcing member 16.

A steering shaft may extend obliquely from a steering wheel provided at a driver's seat toward the bottom of the vehicle through a through hole of the dash panel 20. Referring to FIG. 1, the panel portion 21 of the dash panel 20 may include a sleeve 25 aligned with the through hole.

Figure 5:
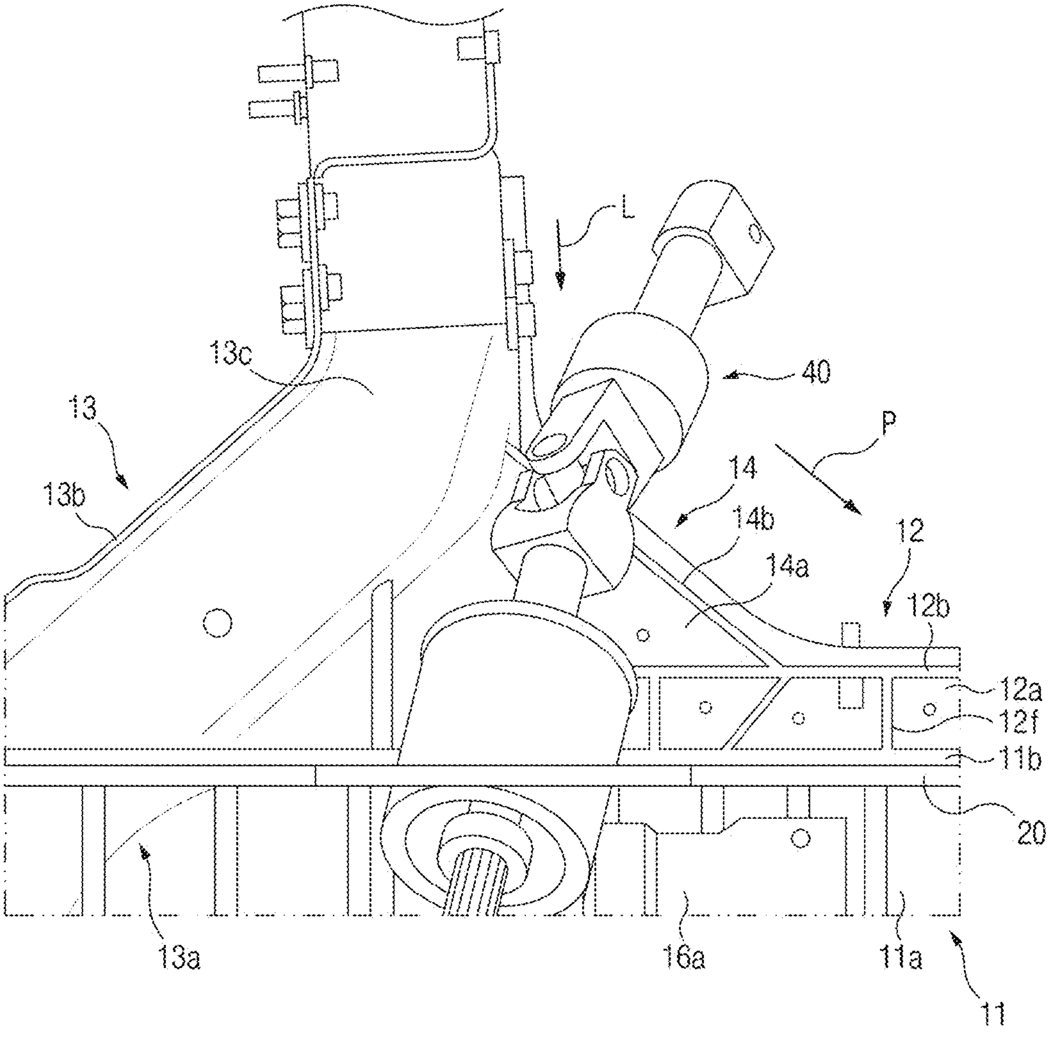
FIG. 5 illustrates a perspective view of a steering shaft and a reinforcing portion of a vehicle body structure according to an exemplary embodiment of the present disclosure.

Referring to FIG. 5, a portion of the steering shaft 40 may be located in front of the reinforcing portion 14 before the driver's seat. When an impact load is applied to the steering shaft 40 (see direction of arrow L) in the event of a vehicle collision/impact, the steering shaft 40 may move along the side extension wall 14*b* of the reinforcing portion 14 (see direction of arrow P), and accordingly the steering shaft 40 may be prevented from intruding into the passenger compartment.

As set forth above, according to exemplary embodiments of the present disclosure, the HVAC module mounted in the openings of the dash panel may be connected to the front portion of the dash crossmember through the brackets, and the protective wall for protecting the HVAC module may be connected to the front portion of the dash crossmember. Accordingly, the HVAC module and the protective wall may be stably supported by the front portion of the dash crossmember, and the mounting of the HVAC module and the protective wall may be facilitated.

According to exemplary embodiments of the present disclosure, the pair of reinforcing portions may be provided at both ends of the front portion of the dash crossmember, and each reinforcing portion may form a triangular truss structure so that the stiffness and strength of the dash crossmember may be improved. In particular, the reinforcing portions may integrally connect the front portion and the corresponding outrigger portions so that deformation between the front portion and the outrigger portions may be minimized in the event of a vehicle collision/impact.

According to exemplary embodiments of the present disclosure, the reinforcing members may be connected to the cross portion of the dash crossmember, and the reinforcing portions may be aligned with the reinforcing members along the longitudinal direction of the vehicle, respectively, so that the stiffness, strength, and crashworthiness of the vehicle body structure may be improved.

According to exemplary embodiments of the present disclosure, a portion of the steering shaft may be located in front of the reinforcing portion of the dash crossmember. In the event of a vehicle collision/impact, the steering shaft may move along the side extension wall of the reinforcing portion, and accordingly the steering shaft may be prevented from intruding into the passenger compartment.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle body structure comprising:
- a floor panel;
- a dash crossmember mounted at a front edge of the floor panel, the dash crossmember comprising:
  - a cross portion extending in a width direction of a vehicle; and
  - a front portion protruding from the cross portion toward a front of the vehicle, the front portion comprising a horizontal wall protruding horizontally from the cross portion toward the front of the vehicle, an upper flange extending vertically upward from the horizontal wall, and a lower flange extending vertically downward from the horizontal wall, wherein the horizontal wall, the upper flange, and the lower flange each extend in the width direction of the vehicle; and
- a dash panel connected to a top edge of the dash crossmember.

2. The vehicle body structure according to claim 1, wherein the upper flange is vertically aligned with the lower flange.

3. The vehicle body structure according to claim 1, further comprising:
- a heating, ventilation, and air conditioning (HVAC) module mounted in the dash panel; and
- a protective wall disposed on a front portion of the HVAC module.

4. The vehicle body structure according to claim 3, wherein:
- the HVAC module is connected to the upper flange of the front portion through a bracket; and
- a bottom flange of the protective wall is mounted on the lower flange of the front portion.

5. The vehicle body structure according to claim 4, wherein:
- the front portion further comprises a stud bolt protruding from the lower flange toward the front of the vehicle; and
- the bottom flange of the protective wall is mounted on the stud bolt.

6. The vehicle body structure according to claim 4, wherein:
- the front portion further comprises a protruding wall protruding toward the front of the vehicle;
- the protective wall further comprises a second horizontal wall connected to the bottom flange and a recessed wall recessed from the second horizontal wall; and
- the protruding wall of the front portion contacts a top surface of the recessed wall of the protective wall.

7. The vehicle body structure according to claim 6, wherein the protruding wall is horizontally aligned with the horizontal wall of the front portion.

8. The vehicle body structure according to claim 1, wherein the front portion further comprises a plurality of reinforcing ribs provided on the horizontal wall.

9. The vehicle body structure according to claim 1, wherein:
- the cross portion further comprises a reinforcement and a vertical wall extending vertically from the reinforcement; and
- a bottom edge of the dash panel is fixed to a top edge of the vertical wall.

10. The vehicle body structure according to claim 9, wherein the horizontal wall of the front portion protrudes horizontally from the vertical wall of the cross portion toward the front of the vehicle.

11. A vehicle body structure comprising:
- a floor panel;
- a dash crossmember mounted at a front edge of the floor panel, the dash crossmember comprising:
  - a cross portion extending in a width direction of a vehicle;
  - a front portion protruding from the cross portion toward a front of the vehicle, the front portion comprising a horizontal wall protruding horizontally from the cross portion toward the front of the vehicle, an upper flange extending vertically upward from the horizontal wall, and a lower flange extending vertically downward from the horizontal wall, wherein the horizontal wall, the upper flange, and the lower flange each extend in the width direction of the vehicle;
  - a pair of outrigger portions disposed at both ends of the cross portion; and
  - a pair of reinforcing portions disposed at both ends of the front portion, wherein a width of each reinforcing portion of the pair of reinforcing portions gradually increases from each end of the front portion toward a corresponding outrigger portion of the pair of outrigger portions; and
- a dash panel connected to a top edge of the dash crossmember.

12. The vehicle body structure according to claim 11, wherein:

each reinforcing portion of the pair of reinforcing portions comprises a second horizontal wall and a side extension wall disposed at a front edge of the second horizontal wall; and the side extension wall extends diagonally from the end of the front portion toward the corresponding outrigger portion of the pair of outrigger portions.

13. The vehicle body structure according to claim 12, wherein each reinforcing portion of the pair of reinforcing portions further comprises a reinforcing rib disposed on the horizontal wall thereof.

14. The vehicle body structure according to claim 11, further comprising a pair of reinforcing members mounted on the floor panel, wherein each reinforcing member of the pair of reinforcing members extends in a longitudinal direction of the vehicle.

15. The vehicle body structure according to claim 14, wherein each reinforcing portion of the pair of reinforcing portions is aligned with a corresponding reinforcing member of the pair of reinforcing members along the longitudinal direction of the vehicle.

16. The vehicle body structure according to claim 14, wherein each reinforcing member of the pair of reinforcing members has a higher strength than the dash crossmember.

17. A vehicle body structure comprising:

a floor panel;

a dash crossmember mounted at a front edge of the floor panel, the dash crossmember comprising:

a cross portion extending in a width direction of a vehicle;

a front portion protruding from the cross portion toward a front of the vehicle, the front portion comprising a horizontal wall protruding horizontally from the cross portion toward the front of the vehicle, an upper flange extending vertically upward from the horizontal wall, and a lower flange extending vertically downward from the horizontal wall, wherein the horizontal wall, the upper flange, and the lower flange each extend in the width direction of the vehicle;

a pair of outrigger portions disposed at both ends of the cross portion; and a pair of reinforcing portions disposed at both ends of the front portion, wherein a width of each reinforcing portion of the pair of reinforcing portions gradually increases from each end of the front portion toward a corresponding outrigger portion of the pair of outrigger portions;

a dash panel connected to a top edge of the dash crossmember;

a heating, ventilation, and air conditioning (HVAC) module mounted in the dash panel; and a protective wall disposed on a front portion of the HVAC module.

18. The vehicle body structure according to claim 17, wherein:

the HVAC module is connected to the upper flange of the front portion through a bracket; and a bottom flange of the protective wall is mounted on the lower flange of the front portion.

19. The vehicle body structure according to claim 18, wherein:

the front portion further comprises a stud bolt protruding from the lower flange toward the front of the vehicle; and the bottom flange of the protective wall is mounted on the stud bolt.

20. The vehicle body structure according to claim 18, wherein:

the front portion further comprises a protruding wall protruding toward the front of the vehicle;

the protective wall further comprises a second horizontal wall connected to the bottom flange and a recessed wall recessed from the second horizontal wall; and the protruding wall of the front portion contacts a top surface of the recessed wall of the protective wall and is horizontally aligned with the horizontal wall of the front portion.

* * * * *